United States Patent [19]

Hsu et al.

[11] 4,428,968

[45] Jan. 31, 1984

[54] PREPARATION OF SAUERKRAUT UTILIZING HYDROLYZED PROTEIN

[75] Inventors: Jau Y. Hsu; Elaine R. Wedral, both of Brookfield, Conn.; William J. Klinker, Blue Island, Ill.

[73] Assignee: Societe D'Assistance Technique Pour Produits Nestle S.A., Lausanne, Switzerland

[21] Appl. No.: 435,074

[22] Filed: Oct. 18, 1982

[51] Int. Cl.$^3$ .............................................. A23L 1/218
[52] U.S. Cl. .......................................... 426/49; 426/8; 426/51; 426/650
[58] Field of Search .................... 426/49, 481, 51, 615, 426/533, 650, 8, 52

[56] References Cited

U.S. PATENT DOCUMENTS 3,840,674 10/1974 Mosher ............................... 426/533
4,242,361 12/1980 Christ et al. .......................... 426/49

OTHER PUBLICATIONS

Desrosier, Norman W., Elements of Food Technology; 1977, AVI Publ. Co. pp. 246-250.
Lopez, Anthony, A Complete Course in Canning, 1970 The Canning Trade, Inc. pp. 241-246.

Primary Examiner—Thomas G. Wiseman
Assistant Examiner—Marianne S. Minnick
Attorney, Agent, or Firm—Vogt & O'Donnell

[57] ABSTRACT

Flavored sauerkraut is produced by fermenting cabbage in the presence of salt and a powdered hydrolyzed protein. The salt is preferably present in an amount of from 1.0% to 4.5% by weight based on the cabbage and the hydrolyzed protein is preferably preset in an amount of from 1% to 10% by weight based on the weight of the cabbage.

3 Claims, No Drawings

PREPARATION OF SAUERKRAUT UTILIZING HYDROLYZED PROTEIN

The present invention provides a process for the production of flavored sauerkraut which comprises fermenting cabbage in the presence of a powdered hydrolysed protein therein the total amount of salt present in the process is from 1.0% to 4.5% by weight based on the weight of cabbage.

The total amount of salt present in the fermentation process is conveniently from 1.5% to 4.0% by weight, preferably 1.75% to 3.75% by weight and especially from 2.0% to 3.6% by weight based on the weight of the cabbage.

Powdered hydrolysed protein usually contains from 30% to 50% by weight of salt based on the weight of the protein and, if desired, all the salt that is present in the process may be contained wholly within the protein.

Alternatively some salt may be added separately in addition to that contained in the powdered hydrolysed protein so that the desired amount of salt is present in the fermentation process.

The amount of powdered hydrolysed protein present in the fermentation process may be from 0.5% to 15% by weight, preferably from 0.75% to 12% by weight and especially from 1% to 10% by weight based on the weight of the cabbage.

The hydrolysed protein may be of plant or animal origin and may be a chemically or enzymatically hydrolysed protein. For example, the hydrolysed protein may be a chemical hydrolysate prepared from a plant or animal source, an autolysed yeast extract from brewer's or baker's yeast, soy sauce from enzymatically degraded soy sauce or soy and wheat mixtures, or meat flavors based on hydrolysed proteins reacting with other ingredients such as reducing sugars, thiamine or cysteine.

The use of hydrolysed protein or a mixture of hydrolysed protein and salt for the fermentation of cabbage produces an acidity equal to or higher than when salt alone is used even allowing for the fact that hydrolysed protein itself contains acids (levulinic and formic acids in chemically hydrolysed proteins and lactic acid in enzymatically hydrolysed proteins). This can be demonstrated by subtracting the initial acidity (of the acids which already exist in the hydrolysed protein) from the final acidity.

The fermentation process is conveniently carried out by thoroughly mixing the cabbage, preferably in shredded form, with the hydrolysed protein and then pressing in a tank for a few weeks, suitably 3 to 6 weeks, at a temperature from 15° C. to 25° C.

By the fermentation process, solid sauerkraut and sauerkraut juice are obtained and, if desired, each may be pasteurised and canned separately. Accordingly, the present invention also provides solid sauerkraut or sauerkraut juice whenever prepared by the process of this invention.

Optionally, the sauerkraut juice may be further mixed with hydrolysed protein to produce a flavored seasoning product. The present invention, therefore, also provides a mixture of hydrolysed protein and sauerkraut juice prepared by the process of the present invention. The mixture of sauerkraut juice and hydrolysed protein may contain from 25% to 45% by weight and preferably from 30% to 40% by weight of hydrolysed protein based on the weight of the mixture.

The sauerkraut produced by the process of this invention has a meaty flavor. In addition, the hydrolysed proteins in the sauerkraut produced by the process of the present invention have a more natural, fermented flavor characteristic owing to the presence of lactic acid, ethanol and esters produced during the fermentation. The flavor of the hydrolysed protein is thus improved, and this is especially marked in chemically hydrolysed proteins.

The following Examples further illustrate the present invention in which parts and percentages are given by weight.

EXAMPLE 1

95 parts of fresh shredded cabbage at 18° C. were mixed with 5 parts of chicken flavored chemically hydrolysed plant protein containing 45% salt. The salt contributed by the hydrolysed protein is thus 2.25 parts. The hydrolysed protein and shredded cabbage weighing 110 kilograms were mixed well and the cabbage was tightly packed in a tank. The cabbage was covered with layers of plastic liner which were covered with water containing 2% salt on a weight/weight basis. The volume of water used was one third of the volume of the tank. The tank was stored at 20°-23° C. for 4 weeks. Juice samples were collected before and after the fermentation period and their pH and acidity levels were analysed. The pH fell from 5.10 to 3.86 while the acidity increased from 0.60% to 2.33%. The sauerkraut had a chicken type flavor characteristic and had a texture similar to that obtained by normal fermentation using salt. The sauerkraut was afterwards pasteurised and canned.

COMPARATIVE EXAMPLE

A similar procedure to that described in Example 1 was followed except that 97.75 parts of fresh shredded cabbage were mixed with 2.25 parts of salt and fermented in the absence of any hydrolysed protein. The sauerkraut did not have a meaty flavor and the pH fell from 6.60 to 3.44 while the acidity increased from 0.07% to 1.70%. The increase in acidity of 1.63 is therefore not as great as that during fermentation using hydrolysed plant protein in Example 1 which is 1.73.

EXAMPLE 2

96 parts of fresh shredded cabbage at 18° C., 2.8 parts of chicken flavored chemically hydrolysed plant protein containing 45% salt and 1.2 parts salt were mixed and treated in a similar manner to that described in Example 1. After fermentation, the sauerkraut had a chicken flavor, an acidity of 1.82% and a pH of 3.81.

EXAMPLE 3

A similar procedure to that described in Example 1 was followed but using 93.9 parts cabbage and 6.1 parts of a beef flavored hydrolysed plant protein containing 37% salt. The pH of the sauerkraut was 3.86 and the acidity increased from 0.67% to 2.70%. The sauerkraut had a beef flavor characteristic.

EXAMPLE 4

A similar procedure to that described in Example 1 was followed but using only 2.6 parts of the chicken flavored chemically hydrolysed protein containing 45% salt with 97.4 parts of shredded fresh cabbage. The sauerkraut had a chicken flavor, an acidity of 2.32% and a pH of 3.88.

EXAMPLE 5

A similar procedure to that described in Example 1 was followed but using 7.2 parts of the chicken flavored chemically hydrolysed protein containing 45% salt and 92.8 parts of cabbage. The sauerkraut had a chicken flavor, an acidity of 2.0% and a pH of 3.96 and the texture was even firmer than that of Example 1.

EXAMPLE 6

A similar procedure to that described in Example 1 was followed wherein the flavored sauerkraut juice obtained was pasteurised and canned. The juice had a natural chicken flavor characteristic and was suitable for use in cooking.

EXAMPLE 7

A similar procedure to that described in Example 3 was followed wherein the flavored sauerkraut juice obtained was pasteurised and canned. The juice had a natural beef flavor characteristic and was suitable for use in cooking.

EXAMPLE 8

A similar procedure to that described in Example 1 was followed wherein 64 parts of the sauerkraut juice obtained was further mixed with 36 parts of the chicken flavored chemically hydrolysed plant protein containing 45% salt to produce a chicken flavored seasoning product

EXAMPLE 9

A similar procedure to that described in Example 3 was followed wherein 58 parts of the sauerkraut juice obtained was further mixed with 42 parts of a beef flavored hydrolysed plant protein containing 37% salt to produce a beef flavored seasoning product.

We claim:

1. A process for the production of flavored solid sauerkraut and sauerkraut juice which comprises fermenting cabbage in the presence of salt in an amount of from 1.0% to 4.5% by weight based on the weight of the cabbage and a powdered hydrolysed protein in an amount of from 1% to 10% by weight based on the weight of the cabbage wherein the total amount of salt present in the process is from 1.0% to 4.5% by weight based on the weight of the cabbage.

2. The process of claim 1, wherein the total amount of salt present in the fermentation process is from 1.75% to 3.75% by weight based on the weight of the cabbage.

3. The process of claim 1, wherein the sauerkraut juice obtained is separated from the fermented cabbage and further mixed with hydrolysed protein to produce a flavored seasoning product.

* * * * *

UNITED STATES PATENT AND TRADEMARK OFFICE
CERTIFICATE OF CORRECTION

PATENT NO. : 4,428,968

DATED : January 31, 1984

INVENTOR(S) : Jau Y. Hsu, et al.

It is certified that error appears in the above—identified patent and that said Letters Patent is hereby corrected as shown below:

Column 1, after the Title and before line 5, the following should be inserted:

--The present invention relates to the production of flavoured sauerkraut, particularly to sauerkraut having meat flavour characteristics.

Sauerkraut which has been flavoured by spices such as caraway seed has been known for a long time. However, up to the present time, sauerkraut having meat flavour characteristics has not been produced. Considering that sauerkraut is usually consumed with meat, it would be very desirable to develop a meaty flavoured sauerkraut.

In the fermentation of sauerkraut, salt is normally used to withdraw water and nutrients from the vegetable tissue. The nutrients furnish the substrate for the growth of lactic acid bacteria. Acids are produced during the fermentation process and the combination of the acids produced during fermentation inhibits the growth of undesirable bacteria and delays enzymatic softening of the sauerkraut. It is also known that during lactic acid fermentation of vegetables, lowering the pH or increasing the acidity at the beginning of the process inhibits the growth of some microorganisms and promotes the growth of acid tolerant bacteria such as lactic acid bacteria.

UNITED STATES PATENT AND TRADEMARK OFFICE
CERTIFICATE OF CORRECTION

PATENT NO. : 4,428,968

DATED : January 31, 1984

INVENTOR(S) : Jau Y. Hsu, et al.

It is certified that error appears in the above—identified patent and that said Letters Patent is hereby corrected as shown below:

We have now surprisingly found that by substituting powdered hydrolysed plant protein, either completely or partially, for the salt which is normally used during the fermentation of cabbage to produce sauerkraut, a meaty flavoured sauerkraut is produced, the growth of lactic acid bacteria is promoted and the production of lactic acid is increased without the necessity of lowering the pH or increasing the acidity at the beginning of the process.--

Column 1, line 5, "The" should read --Accordingly, the--.

Column 3, line 29, "further mixed with" should read --mixed with a further--.

Column 4, line 8, "further mixed with" should read --mixed with a further--.

Claim 1, Column 4, lines 18-20, delete "wherein the total amount of salt present in the process is from 1.0% to 4.5% by weight based on the weight of the cabbage."

Signed and Sealed this

Twelfth Day of June 1984

[SEAL]

Attest:

GERALD J. MOSSINGHOFF

Attesting Officer  Commissioner of Patents and Trademarks